May 14, 1957  N. E. DASHER ET AL  2,792,245
MEANS FOR ATTACHING A BEZEL
Filed Nov. 29, 1956  2 Sheets-Sheet 2
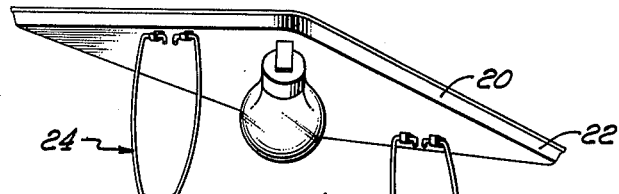
Fig. 7.
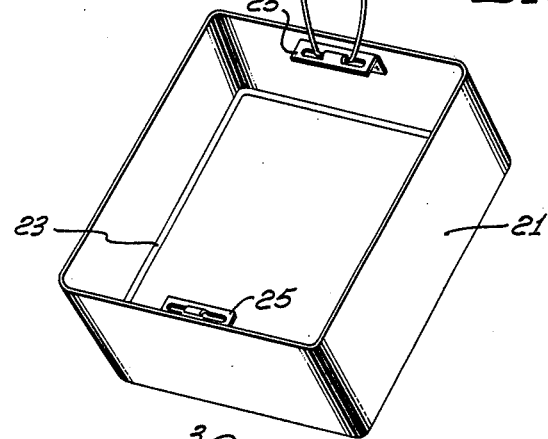
Fig. 6.
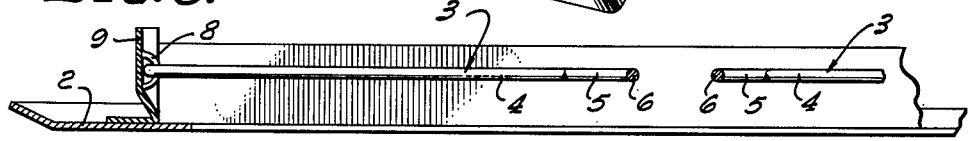
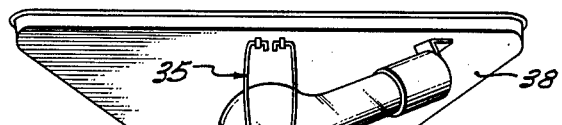
Fig. 8.
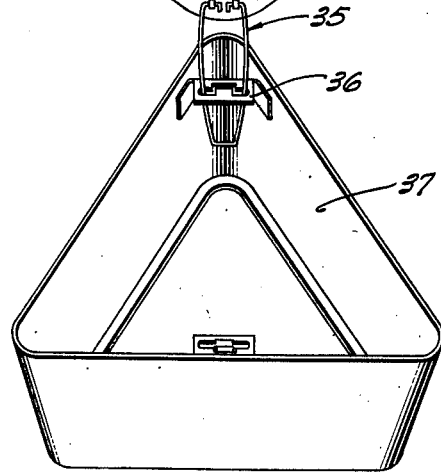
INVENTORS
NORMAN E. DASHER
JEROME H. FEIG
BY
Lyon & Lyon
ATTORNEYS.

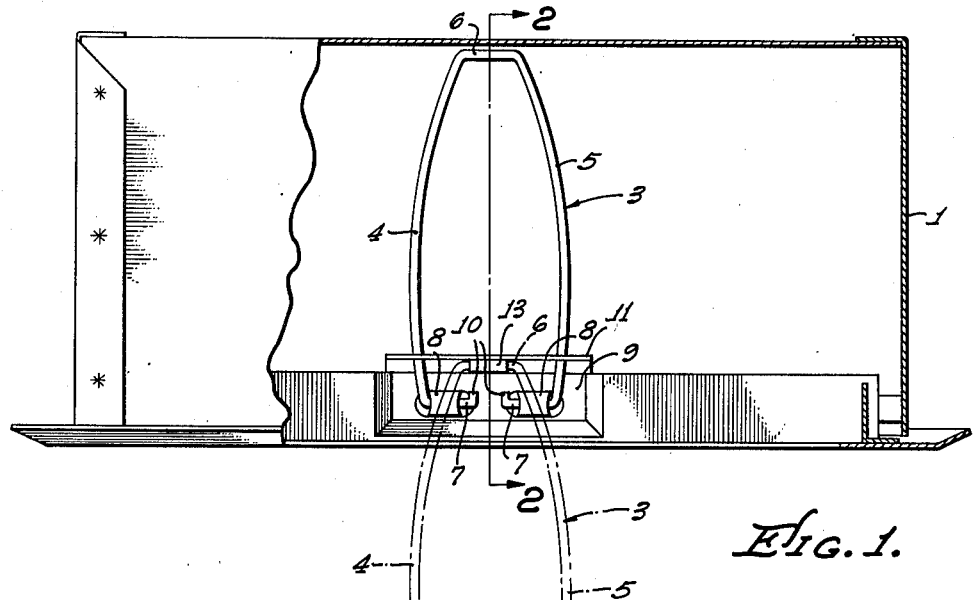
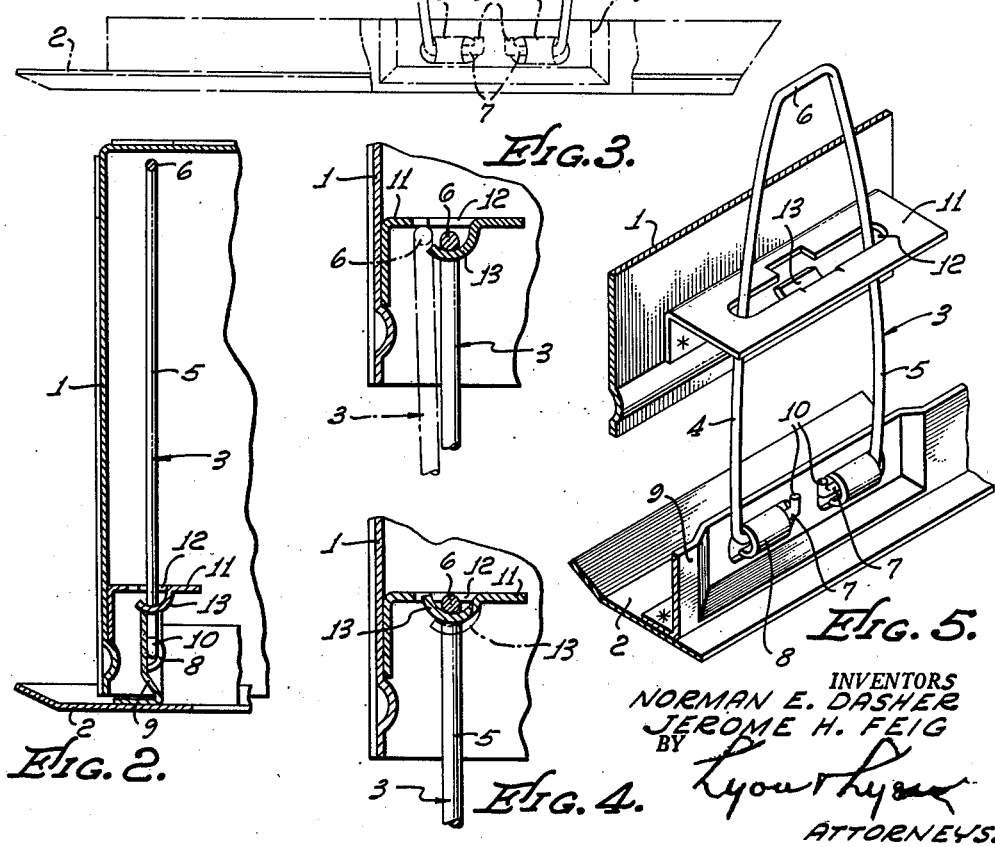

United States Patent Office 2,792,245
Patented May 14, 1957

2,792,245

MEANS FOR ATTACHING A BEZEL

Norman E. Dasher, Burbank, and Jerome H. Feig, North Hollywood, Calif., assignors to Marvin Electric Manufacturing Company, Los Angeles, Calif., a corporation of California Application November 29, 1956, Serial No. 625,079

8 Claims. (Cl. 292—76)

Our invention comprises means for attaching a bezel to a housing and more specifically to a means for releasably holding the bezel on the housing of a light fixture so that the bezel can be pulled away from the face of the housing to change light bulbs in the housing or to permit other operations within the housing.

While it is known to use torsion springs for this purpose, such as that shown in the Florence Patent 2,701,299, such torsion springs have several defects which are overcome by the present invention. The torsion springs of the Florence patent must at all times extend from the bezel perpendicular to the plane of the bezel. Thus in shipping such a device, a deep and rather cumbersome package must be used to protect the torsion springs as they extend either directly outward from the bezel or from the housing. As it is customary to ship the bezels and housing separately and often replacement bezels are shipped the torsion springs must be either unscrewed or compeltely detached, and a very cumbersome packaging probably results. In our invention, we use a spring clip which is permanently attached to the bezel and extends through a slotted bracket in the housing and by means of pressure, the legs of the spring clips on the ends of the slot in the bracket, the bezel is maintained either in its open or closed position. The spring clip can be removed from the brackets so as to separate the bezel entirely from the housing. When this is done, the spring clips are able to rotate in their attaching slots on the bezel so that they lie parallel to the plane of the housing, making them packageable in a small, flat container no larger than the bezel itself. Another disadvantage that the torsion spring type of holding clip has is that the legs of the torsion spring, when the bezel is closed, stick out laterally from slots in the housing and prevent a tight sealing of the bezel against the housing. This deficiency in torsion spring fasteners is overcome by our spring clip means as the spring clip never extends outwardly further than the edges of the slots in the bracket.

Other objects and advantages of our invention will be apparent from the following description of the preferred embodiment thereof.

In the drawings:

Figure 1 is a side elevation partially sectioned and showing in phantom the bezel open;

Figure 2 is a section taken on the line 2—2 of Figure 1;

Figure 3 is an enlarged fragmentary section of a detail;

Figure 4 is an enlarged fragmentary section of a modified form of a detail; and

Figure 5 is a partial perspective;

Figure 6 is a partial section showing the spring clip in folded position;

Figure 7 is a perspective of a modification; and

Figure 8 is a perspective of a modification.

A light fixture incorporating therein our invention can be of any type such as the recessed lighting fixture shown in the drawings. Of course, the fixture can be of any shape and we have shown the fixture as substantially rectangular merely for the purposes of illustrating the invention.

Such a fixture comprises a housing 1 in which is mounted the usual light bulb socket which has been deleted from the drawings for the purposes of clarity as it does not enter into any part of this invention. The housing 1 can be in the form of a box having four sides and a top with its bottom open. The open bottom is closed by a bezel 2 of any shape or size which may be decorative or not, as desired. The bezel 2, of course, will carry a light diffusing lens. To maintain the bezel 2 in contact with the bottom edges of the sides of the housing 1, we provide a spring clip 3 which is U-shaped and formed from spring steel wire having legs 4 and 5 bowed outwardly from each other. The legs 4 and 5 are joined together at one end as indicated at 6. The legs 4 and 5 have their ends bent over to form hangers 7. The hangers 7 are rotatively positioned under the tabs 8 formed on a bracket 9 attached to the inner surface of the bezel 2. A further projection 10 on the hangers 7 prevents the hangers 7 from being withdrawn from under the tabs 8.

Upon the inner surface of the box 1 is provided a bracket 11 having therethrough a slot 12. The spring clip 3 is passed through the slot 12. A projection 13 on the bracket 11 extends across the slot 12 and is adapted to engage the end 6 of the spring clip 3 to prevent the spring clip 3 from being pulled out of the slot 12. Ordinarily, we prefer to have the projection 13 extend only partly across slot 12 as shown in Figure 3, so that the spring 3 may be lifted over the end of the projection 13 so that it can be completely removed from the slot 12. However, sometimes it is desirable that the bezel be permanently attached to the housing 1 and in that case, the projection 13 is bent further than shown in Figure 3 to the position shown in Figure 4, so that the spring clip 3 cannot be removed from the slot 12.

One or more of these spring clips 3 and means of attaching to the bezel and housing can be used. Ordinarily, on a rectangular or round housing 1, one spring clip is used at opposite sides of the box 1.

In the operation of our holding means, the legs 4 and 5 of the spring clip 3 exert pressure on the ends of the slot 12 and are compressed together by that slot. This pressure, when the bezel is in the closed position, maintains the bezel tightly against the bottom edges of the box 1. A mere pull on the bezel 2 pulls the legs 4 and 5 through the slot 12 until the end 6 is engaged by the projection 13. The spring pressure of the legs 4 and 5 against the edges of the slot 12 maintains the bezel in any desired position. It should be noted that when the projection 13 does not close the slot 12, one of the spring clips 3 can be removed from the slot 12 so that the bezel hangs at right angles to its ordinary plane, permitting the complete opening of the housing 1 for the purpose of changing bulbs and the like.

In shipping bezels having our holding means attached, the spring clip 3 is detached from the housing and then can be turned under the tabs 8 so that the two spring clips rotate inwardly and lie flat against the lens in the bezel.

Figure 7 illustrates the use of our invention in a surface mounted fixture rather than in a recessed fixture illustrated in Figure 1. In this type invention, a socket holding plate 20 is attached to the ceiling or other support and has a housing 21 which fits on against the shoulder edges 22 and carries a light bezel 23. The housing 21 is attached to the plate by spring clips 24 similar to spring clips 3 of Figure 1 in the opposite manner to the recessed lighting fixture. In other words, they are permanently attached to the plate 20 and slide in and out of a slotted bracket 25 on the housing 21 which is similar to the bracket 11.

Similarly in Figure 8 is shown a triangular fixture here illustrated as a surface mounted fixture but which could be reversed and formed into a recessed fixture. This form of the invention shows one of the advantages of our spring clip in that clip 35 is attached to a slotted bracket 36 attached to a bezel carrying housing 37. Spring clips of the torsion type could not be used in the corners of the housing 37 because when the housing 37 and plate 38 are closed, the legs of the torsion spring would have no space to extend outwardly and would strike the sides of the housing preventing any real pressure against the slots 38 to maintain the fixture in a closed position.

We claim:

1. In a light fixture, a housing, a bezel for closing one side of said housing, a bracket carried by said bezel, a U-shaped spring clip having projections on its open end, means carried by said bracket to attach said projections to said bracket, a slotted bracket attached to said housing through which said spring clip extends and means to prevent said spring clip from being pulled from said slot.

2. In a light fixture, a housing, a bezel for closing one side of said housing, a bracket carried by said bezel, a U-shaped spring clip having projections on its open end, means carried by said bracket to attach said projections to said bracket, a slotted bracket attached to said housing through which said spring clip extends and means to prevent said spring clip from being pulled from said slot; said last mentioned means comprising a support for the closed end of said spring clip when said spring clip is pulled out of said slotted bracket until said closed end engages said last mentioned means.

3. In a light fixture, a housing, a bezel for closing one side of said housing, a bracket carried by said bezel, a U-shaped spring clip having projections on its open end, means carried by said bracket to attach said projections to said bracket, a slotted bracket attached to said housing through which said spring clip extends; said slot being smaller in size than the width of said spring clip whereby the legs of said spring clip exert pressure on the ends of said slot; and means to prevent said spring clip from being pulled from said slot.

4. In a light fixture, a housing, a bezel for closing one side of said housing, a bracket carried by said bezel, a U-shaped spring clip having projections on its open end, means carried by said bracket to attach said projections to said bracket, a slotted bracket attached to said housing through which said spring clip extends; said slot being smaller in size than the width of said spring clip whereby the legs of said spring clip exert pressure on the ends of said slot; and means to prevent said spring clip from being pulled from said slot; said last mentioned means comprising a support for the closed end of said spring clip when said spring clip is pulled out of said slotted bracket until said closed end engages said last mentioned means.

5. In a light fixture, a housing, a bezel for closing one side of said housing, a bracket carried by said bezel, a U-shaped spring clip having projections on its open end and its legs outwardly bowed, means carried by said bracket to attach said projections to said bracket, a slotted bracket attached to said housing through which said spring clip extends and means to prevent said spring clip from being pulled from said slot.

6. In a light fixture, a housing, a bezel for closing one side of said housing, a bracket carried by said bezel, a U-shaped spring clip having projections on its open end and its legs outwardly bowed, means carried by said bracket to attach said projections to said bracket, a slotted bracket attached to said housing through which said spring clip extends and means to prevent said spring clip from being pulled from said slot; said last mentioned means comprising a support for the closed end of said spring clip when said spring clip is pulled out of said slotted bracket until said closed end engages said last mentioned means.

7. In a light fixture, a housing, a bezel for closing one side of said housing, a bracket carried by said bezel, a U-shaped spring clip having projections on its open end and its legs outwardly bowed, means carried by said bracket to attach said projections to said bracket, a slotted bracket attached to said housing through which said spring clip extends; said slot being smaller in size than the width of said spring clip whereby the legs of said spring clip exert pressure on the ends of said slot; and means to prevent said spring clip from being pulled from said slot.

8. In a light fixture, a housing, a bezel for closing one side of said housnig, a bracket carried by said bezel, a U-shaped spring clip having projections on its open end and its legs outwardly bowed, means carried by said bracket to attach said projections to said bracket, a slotted bracket attached to said housing through which said spring clip extends; said slot being smaller in size than the width of said spring clip whereby the legs of said spring clip exert pressure on the ends of said slot; and means to prevent said spring clip from being pulled from said slot; said last mentioned means comprising a support for the closed end of said spring clip when said spring clip is pulled out of said slotted bracket until said closed end engages said last mentioned means.

References Cited in the file of this patent

Publication, Lighting and Lamps, September 1947, page 17, 240–78H. (Copy in Div. 62, U. S. Patent Office.)